(12) United States Patent
Seurat

(10) Patent No.: US 10,492,642 B2
(45) Date of Patent: Dec. 3, 2019

(54) ELECTRIC COOKING APPLIANCE FOR PREPARING FRIED FOOD

(71) Applicant: SEB S.A., Ecully (FR)

(72) Inventor: Frédéric Seurat, Bretigny (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 16/327,134

(22) PCT Filed: Jul. 21, 2017

(86) PCT No.: PCT/FR2017/052022
§ 371 (c)(1),
(2) Date: Feb. 21, 2019

(87) PCT Pub. No.: WO2018/037177
PCT Pub. Date: Mar. 1, 2018

(65) Prior Publication Data
US 2019/0216262 A1    Jul. 18, 2019

(30) Foreign Application Priority Data

Aug. 22, 2016 (FR) ...................... 16 57848

(51) Int. Cl.
*A47J 37/06* (2006.01)
*A47J 37/12* (2006.01)

(52) U.S. Cl.
CPC ....... *A47J 37/0641* (2013.01); *A47J 37/1257* (2013.01); *A47J 37/1261* (2013.01); *A47J 37/1276* (2013.01)

(58) Field of Classification Search
CPC ................ A47J 37/0623; A47J 37/0641; A47J 37/1209; A47J 37/128; A47J 37/1261; A47J 37/1276

USPC ................................ 219/399, 400, 403, 430
See application file for complete search history.

(56) References Cited

U.S. PATENT DOCUMENTS

| | | | |
|---|---|---|---|
| 2003/0205569 A1* | 11/2003 | Chang | A47J 37/0623 219/400 |
| 2015/0292750 A1* | 10/2015 | Delrue | A47J 37/0641 219/400 |

OTHER PUBLICATIONS

International Preliminary Report on Patentability and the Written Opinion of the International Searching Authority as issued in International Patent Application No. PCT/FR2017/052022, dated Feb. 26, 2019.
International Search Report as issued in International Patent Application No. PCT/FR2017/052022, dated Nov. 30, 2017.

* cited by examiner

*Primary Examiner* — Phuong T Nguyen
(74) *Attorney, Agent, or Firm* — Pillsbury Winthrop Shaw Pittman LLP

(57) ABSTRACT

An electric cooking appliance includes a base, a ventilation system arranged to create an airflow, a heating system arranged to heat the airflow, and a removable cooking basket. The appliance also includes a removable housing accommodating the ventilation system and the heating system, the housing being designed to be arranged on the base in order to cook the food arranged in the cooking basket carried by the base, a removable container designed to receive a cooking bath, another removable housing from which there extends a heating element, the other housing being designed to be arranged on the base in order to cook the food arranged in the container.

15 Claims, 3 Drawing Sheets

ELECTRIC COOKING APPLIANCE FOR PREPARING FRIED FOOD

CROSS-REFERENCE TO RELATED APPLICATIONS

This application is the U.S. National Stage of PCT/FR2017/052022, filed Jul. 21, 2017, which in turn claims priority to French patent application number 1657848 filed Aug. 22, 2016. The content of these applications are incorporated herein by reference in their entireties.

This invention concerns the technical field of electric cooking appliances designed for preparing fried foods.

It is known to prepare fried foods with an electric cooking appliance comprising a cooking space exposed to a hot airflow. Such an appliance makes it possible in particular to fairly quickly obtain fried foods ready to be eaten, in particular from pre-fried foods.

However, all appliances of this type still do not perform well for cooking doughnuts or breaded preparations.

One objective of this invention is to propose an appliance of the aforementioned type that would perform equally well for cooking doughnuts or breaded preparations.

Another objective of this invention is to propose an electric cooking appliance that makes it possible to prepare a greater variety of foods, in particular fried foods, in a satisfactory manner.

These objectives are reached with an electric cooking appliance comprising:
- a base in which at least a portion of a cooking space is arranged,
- ventilation means arranged to create an airflow in the cooking space,
- heating means arranged to heat the airflow,
- a removable cooking basket arranged to receive foods to be cooked in the cooking space, because this appliance comprises:
- a removable housing accommodating the ventilation means and the heating means, the housing being designed to be arranged on the base in order to cook the foods arranged in the cooking basket,
- a removable container designed to receive a cooking bath,
- another removable housing from which there extends a heating element, the other housing being designed to be arranged on the base in order to cook the foods arranged in the container, the heating element then extending inside the container.

Thus, by using the housing for hot air cooking or the other housing for cooking in an oil bath, it is possible to select the most appropriate cooking method according to the type of fried food to be prepared.

According to one embodiment, the container is used as a replacement for the cooking basket. In other words, the cooking basket is used with the housing and the container is used with the other housing.

If desired, the cooking basket can be configured so that it can be arranged in the container to contain the foods to be cooked. The cooking basket arranged in the container then extends preferably above the heating element when the appliance is used with the other housing.

Advantageously, the base comprises a seating designed to receive at least partially the container and/or the cooking basket. This arrangement simplifies the construction of the appliance.

Advantageously then, the cooking basket is at least partially accommodated in the base when the appliance is used with the housing.

Advantageously then, the container is at least partially accommodated in the base when the appliance is used with the other housing.

Advantageously again, the seating has an upper opening.

According to one embodiment, the base comprises an electric connector, in order to electrically power the heating means and the ventilation means when the housing is arranged on the base, and to electrically power the heating element when the other housing is arranged on the base. The base is then powered by an electric power cord. Alternatively, the housing may be directly powered by an electric power cord and/or the other housing may be directly powered by an electric power cord.

According to one embodiment, the electric cooking appliance comprises a lid arranged on the base, and the cooking space is defined by the housing and the lid arranged on the base.

According to another embodiment, the cooking space is defined by the housing arranged on the base. The use of a lid is then not necessary.

According to one embodiment, the housing has an intake nozzle arranged upstream of the ventilation means, the base comprises an intake area arranged opposite the intake nozzle, and the cooking space communicates with the intake area. This arrangement facilitates the circulation of the airflow in the cooking space.

Advantageously then, the ventilation means are arranged over the intake area. This arrangement improves the circulation of the airflow.

According to one embodiment, the heating means are arranged downstream of the ventilation means. This arrangement simplifies the formation of the ventilation means.

Advantageously then, the housing comprises an exhaust area arranged downstream of the ventilation means, and the heating means are arranged in the exhaust area.

Advantageously again, the cooking basket is arranged downstream of the heating means.

Advantageously again, the heating means are arranged at least partially opposite the foods to be cooked that are received by the cooking basket. This arrangement facilitates cooking by radiation.

Advantageously again, the housing comprises at least one heated air outlet discharging opposite the cooking basket. This arrangement contributes to good cooking performances.

Advantageously again, the airflow goes through a bed of foods to be cooked arranged in the cooking basket. This arrangement promotes more uniform cooking.

Advantageously then, the cooking basket has a perforated bottom allowing the passage of the airflow.

The invention will be more fully understood by examining an embodiment given as an example, which is in no way restrictive, and is illustrated by the attached figures, in which.

Figure 1:
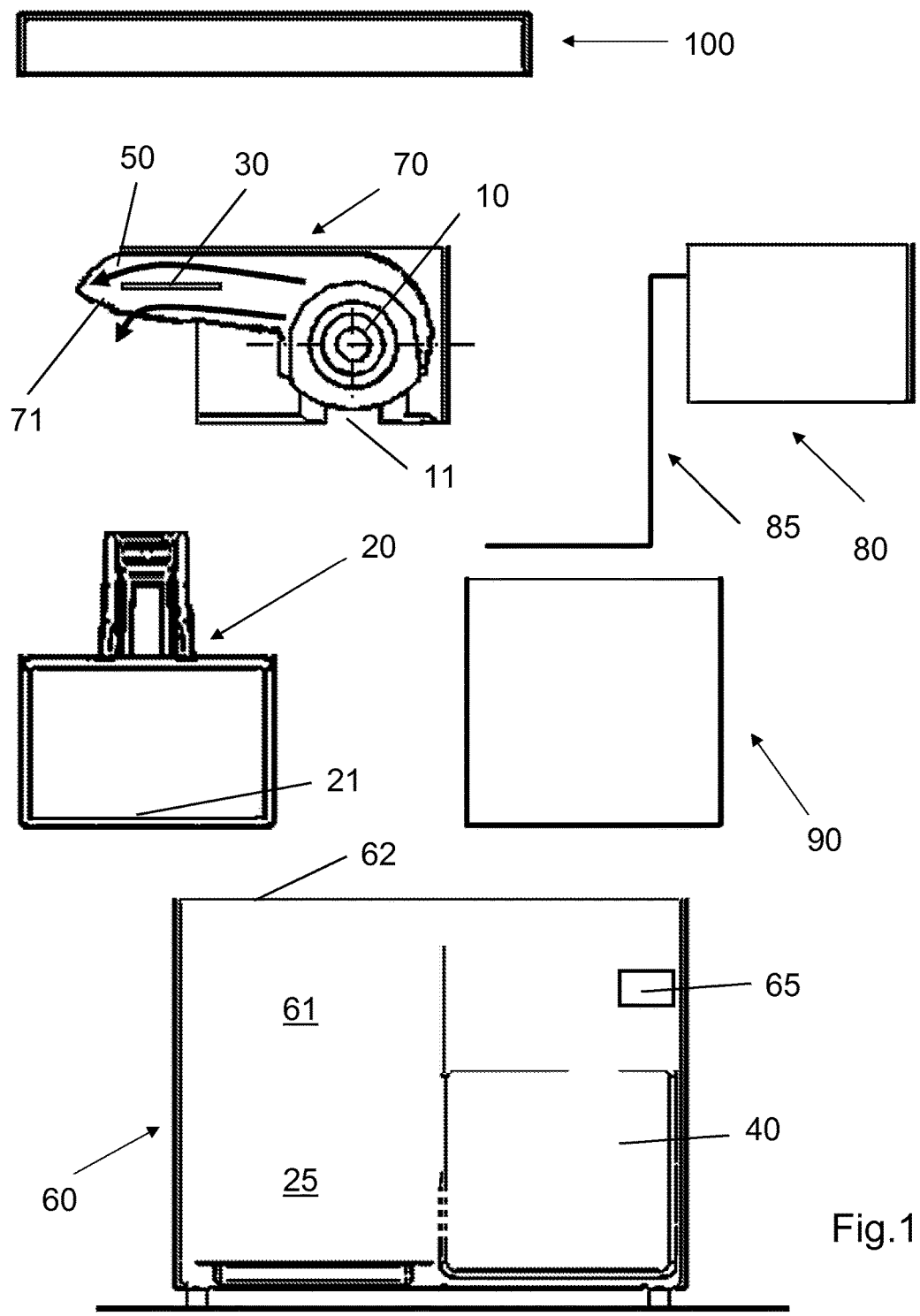
FIG. 1 is a schematic vertical sectional and exploded view of an electric cooking appliance according to this invention.
Figure 2:
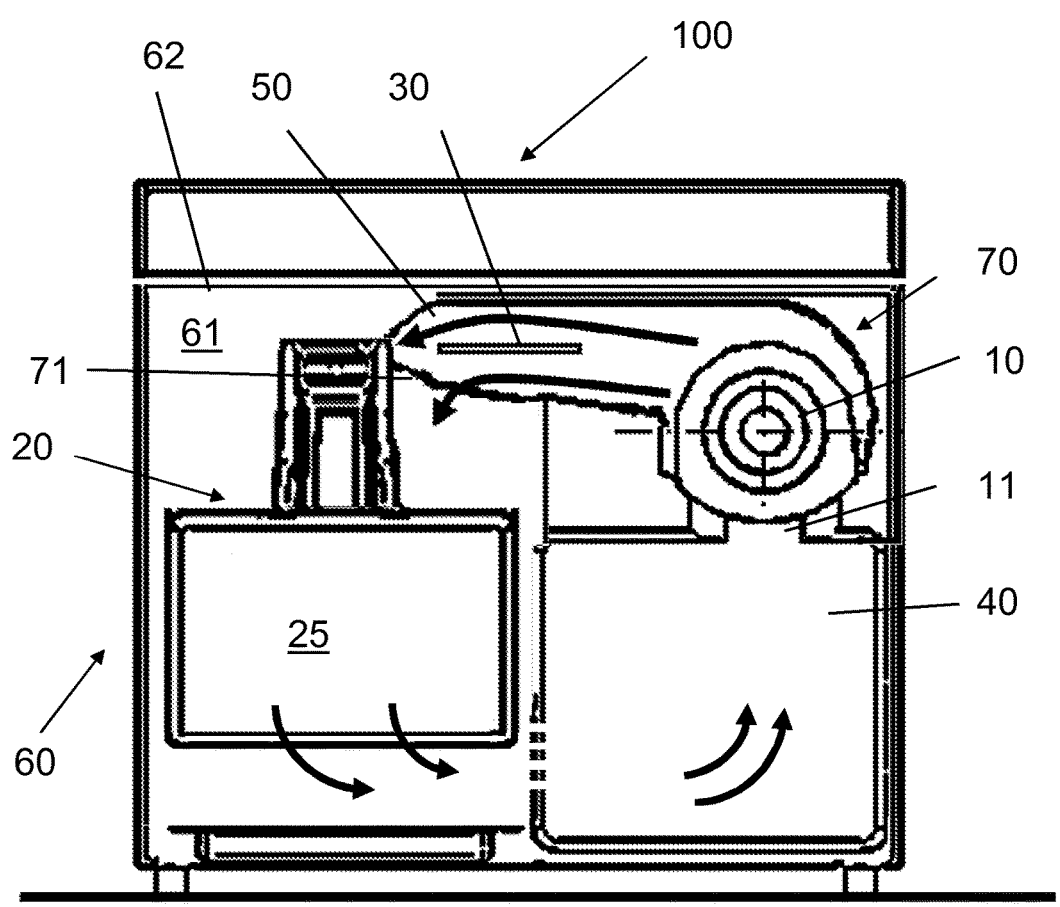
FIG. 2 is a schematic vertical sectional view of the electric cooking appliance in FIG. 1 according to a first use configuration.
Figure 3:
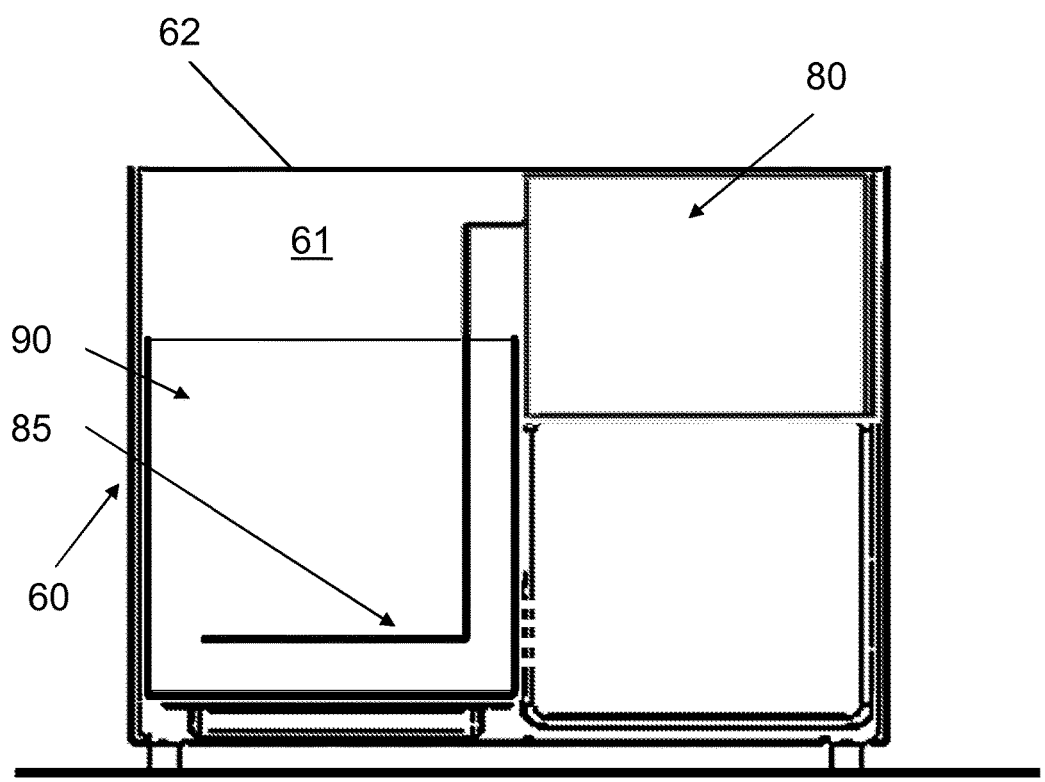
FIG. 3 is a schematic vertical sectional view of the electric cooking appliance in FIG. 1 according to a second use configuration.

The electric cooking appliance illustrated in FIG. 1 comprises a base 60 in which there is arranged at least a portion of a cooking space 25, a removable housing 70 designed to be used in a first use configuration illustrated in FIG. 2, another removable housing 80 designed to be used in a second use configuration illustrated in FIG. 3, a removable cooking basket 20, a removable container 90, and a lid 100.

The base 60 comprises a seating 61 designed to receive at least partially the container 90 and/or the cooking basket 20.

In the embodiment example illustrated in FIGS. 1 to 3, the seating 61 has an upper opening 62. The cooking basket 20 is accommodated in the base 60 when the appliance is used with the housing 70, as represented in FIG. 2. The container 90 is accommodated in the base 60 when the appliance is used with the other housing 80, as represented in FIG. 3.

The housing 70 is designed to be arranged on the base 60 in order to cook the foods arranged in the cooking basket 20 arranged in the cooking space 25. The housing 70 accommodates ventilation means 10 arranged to create an airflow in the cooking space 25, and heating means 30 arranged to heat the airflow.

The other housing 80 is designed to be arranged on the base 60 in order to cook the foods arranged in the container 90 carried by the base 60. A heating element 85 extends from the other housing 80. As shown in FIG. 3, the heating element 85 extends inside the container 90. The heating element 85 is designed to heat the cooking bath arranged in the container 90. The cooking bath may in particular be an oil bath. The heating element 85 is preferably associated with thermostatic regulation means and/or with thermal protection means, not represented in the figures.

In the embodiment example illustrated in FIGS. 1 to 3, the base 60 may carry the cooking basket 20 or the container 90. Thus, the container 90 is used as a replacement for the cooking basket 20. Alternatively, the cooking basket 20 could in particular be carried by the container 90. The cooking basket 20 then extends preferably above the heating element 85 when the appliance is used with the other housing 80.

As represented in FIG. 1, the lid 100 is arranged on the base 60. The cooking space 25 is then defined by the housing 70 and the lid 100 arranged on the base 60, as represented in FIG. 2.

In the embodiment example illustrated in the figures, the base 60 comprises an electric connector 65 in order to electrically power the heating means 30 and the ventilation means 10 when the housing 70 is arranged on the base 60, and to electrically power the heating element 85 when the other housing 80 is arranged on the base 60. For this purpose, the housing 70 and the other housing 80 each comprise another electric connector, not represented in the figures, powered by the connector 65 when the housing 70 or the other housing 80 is arranged on the base 60.

The appliance in the configuration illustrated in FIG. 2 is designed to heat or cook foods with a hot airflow.

In the embodiment example illustrated, the ventilation means 10 comprise a cross-flow fan with a rotor arranged to turn around a rotation axis perpendicular to the plane of FIGS. 1 and 2. The housing 70 has an intake nozzle 11 arranged upstream of the ventilation means 10. The base 60 comprises an intake area 40 arranged opposite the intake nozzle 11. The cooking space 25 communicates with the intake area 40. The heating means 30 are arranged downstream of the ventilation means 10. The housing 70 comprises at least one heated air outlet 71 discharging opposite the cooking basket 20. The cooking basket 20 is thus arranged downstream of the heating means 30.

More particularly in the embodiment example illustrated, the ventilation means 10 are arranged on a side of the cooking space 25. The ventilation means 10 are arranged over the intake area 40. The housing 70 comprises an exhaust area 50 arranged downstream of the ventilation means 10. The heating means 30 are arranged in the exhaust area 50.

Preferably, the heating means 30 are arranged at least partially opposite the foods to be cooked that are received by the cooking basket 20, which makes it possible to expose the foods to be cooked to thermal radiation generated by the heating means 30 in order to brown/grill them.

For the sake of clarity, the foods to be cooked are not represented in the cooking basket 20, in order to visualize the airflow generated by the ventilation means. The ventilation means 10 arranged in the housing 70 draw in air through the intake nozzle 11 into the intake area 40, and blow air out into the exhaust area 50 defined by the housing 70 which also contains the heating means 30. The heating means 30 thus heat the airflow coming out of the ventilation means 10. The heated airflow is then directed towards the cooking basket 20 through the heated air outlet 71.

The airflow goes through a bed of foods to be cooked (not represented in the figures) arranged in the cooking basket 20. For this purpose, the cooking basket 20 has a perforated bottom 21 allowing the passage of the airflow. According to a preferred embodiment, the perforated bottom 21 is made in the form of a grate.

Once it has passed the perforated bottom 21, the airflow is drawn in towards the intake area 40 in order to again pass through the ventilation means 10. If desired the lid 100 may have a lower face conformed to direct the airflow on the cooking basket 20.

The electric cooking appliance according to the invention may be used to quickly cook cut potatoes in order to make French fries by initially coating them with a small quantity of oil or fat, in the configuration represented in FIG. 2. Cooking of other foods, such as meat or other vegetables, can also be envisioned.

The appliance in the configuration illustrated in FIG. 3 is designed in order to cook foods in a cooking bath, in particular for frying foods in a fat bath.

The container 90 is arranged in the base 60 after removing the lid 100, the housing 70 and the cooking basket 20. The other housing 80 is then arranged on the base 60. The user then fills the container 90 with the appropriate quantity of cooking bath. In the absence of steam exhaust, the foods are cooked without the lid 100.

The electric cooking appliance according to the invention may also make it possible to fry breaded preparations or doughnuts in a satisfactory manner, in the configuration represented in FIG. 3. Frying of other foods, such as potatoes, can also be envisioned.

As a variant, the lid 100 does not necessarily extend over the housing 70.

As a variant, the appliance does not necessarily comprise a separate lid 100. The housing 70 may in particular form a lid arranged on the base 60. The cooking space 25 is then defined by the housing 70 arranged on the base 60.

As a variant, the ventilation means 10 do not necessarily comprise a cross-flow fan.

As a variant, the housing 70 does not necessarily have an intake nozzle 11 arranged upstream of the ventilation means 10.

As a variant, the cooking basket 20 may be at least partially accommodated in the base 60 when the appliance is used with the housing 70.

As a variant, the cooking basket 20 is not necessarily removed through the upper opening 62. The base 60 may in particular comprise a side opening designed for the placement and removal of the cooking basket 20.

As a variant, the container 90 may be at least partially accommodated in the base 60 when the appliance is used with the other housing 80.

This invention is in no way limited to the embodiment example described and its variants, but encompasses many modifications in the context of the claims.

The invention claimed is:

1. An electric cooking appliance for either hot air cooking or hot liquid bath cooking, comprising:
   a base in which at least a portion of a cooking space is arranged;
   a ventilation system arranged to create an airflow in the cooking space;
   a heating system arranged to heat the airflow;
   a removable cooking basket arranged to receive foods to be cooked in the cooking space;
   a first removable housing directly supporting the ventilation system and the heating system, the first removable housing being designed to be arranged on the base in order to cook the foods arranged in the removable cooking basket;
   a removable container arranged to receive a cooking bath, and
   a second removable housing from which there extends a heating element separate from the heating system, the second removable housing being separate from the first removable housing and being designed to be arranged on the base in order to cook the foods arranged in the removable container, the heating element then extending inside the removable container,
   wherein the base is constructed and arranged to receive either a first cooking assembly for hot air cooking, the first cooking assembly including the ventilation system, the heating system, the removable cooking basket and the first removable housing, or a second cooking assembly for hot liquid cooking, the second cooking assembly including the removable container and the second removable housing.

2. The electric cooking appliance according to claim 1, wherein the base comprises a seating designed to receive at least partially the removable container or the removable cooking basket.

3. The electric cooking appliance according to claim 2, wherein the seating has an upper opening.

4. The electric cooking appliance according to claim 1, wherein the base comprises an electric connector in order to electrically power the heating system and the ventilation system when the first removable housing is arranged on the base, and to electrically power the heating element when the second removable housing is arranged on the base.

5. The electric cooking appliance according to claim 1, further comprising a lid arranged on the base, and wherein the cooking space is defined by the first removable housing and the lid arranged on the base.

6. The electric cooking appliance according to claim 1, wherein the cooking space is defined by the first removable housing arranged on the base.

7. The electric cooking appliance according to claim 1, wherein the first removable housing has an intake nozzle arranged upstream of the ventilation system, and wherein the base comprises an intake area arranged opposite the intake nozzle, and wherein the cooking space communicates with the intake area.

8. The electric cooking appliance according to claim 7, wherein the ventilation system is arranged over the intake area.

9. The electric cooking appliance according to claim 1, wherein the heating system is arranged downstream of the ventilation system.

10. The electric cooking appliance according to claim 9, wherein the first removable housing comprises an exhaust area arranged downstream of the ventilation system, and wherein the heating system is arranged in the exhaust area.

11. The electric cooking appliance according to claim 1, wherein the removable cooking basket is arranged downstream of the heating system.

12. The electric cooking appliance according to claim 1, wherein the heating system is arranged at least partially opposite the foods to be cooked that are received by the removable cooking basket.

13. The electric cooking appliance according to claim 1, wherein the first removable housing comprises at least one heated air outlet discharging opposite the removable cooking basket.

14. The electric cooking appliance according to claim 1, wherein the airflow goes through a bed of foods to be cooked arranged in the removable cooking basket.

15. The electric cooking appliance according to claim 1, wherein the removable cooking basket has a perforated bottom allowing the passage of the airflow.

* * * * *